United States Patent [19]

Chiang et al.

[11] 3,869,473

[45] Mar. 4, 1975

[54] METHOD FOR THE PREPARATION OF 3-(3'-CARBOXY-4'HYDROXY-1-NAPTHYL)-3-(3''-CARBOXY-4''HYDROXY-1''-NAPTHYL) NAPHTHALIDE

[75] Inventors: Yunn H. Chiang, Woburn; John W. Sparks, Boston, both of Mass.

[73] Assignee: Polaroid Corporation, Cambridge, Mass.

[22] Filed: Dec. 11, 1972

[21] Appl. No.: 314,097

[52] U.S. Cl.......................................... 260/343.2 R
[51] Int. Cl............................................... C07d 5/06
[58] Field of Search............................ 260/343.2 R

[56] References Cited
OTHER PUBLICATIONS

Awad et al., J. Org. Chem., Vol. 25, p. 1872–1874.

*Primary Examiner*—Henry R. Jiles
*Assistant Examiner*—Mildred A. Crowder
*Attorney, Agent, or Firm*—Sybil A. Campbell

[57] ABSTRACT

Carboxy-substituted 1-naphthol naphthalide indicator dyes are prepared by reacting a 2-carboxy-1-naphthol and a 3-acyloxy-3-(3'-lower carboalkoxy-4'-hydroxy-1'-naphthyl) naphthalide in the presence of base to form the corresponding dye precursor which is then hydrolyzed to yield the corresponding indicator dye product.

16 Claims, No Drawings

3,869,473

METHOD FOR THE PREPARATION OF 3-(3'-CARBOXY-4'HYDROXY-1-NAPHTHYL)-3-(3''-CARBOXY-4''HYDROXY-1''-NAPHTHYL) NAPHTHALIDE

BACKGROUND OF THE INVENTION

1. Field of the Invention

This invention relates to a method of preparing naphthalide indicator dyes, and in particular, it relates to the synthesis of certain 1-naphthol naphthalides useful as reagents in photography.

2. Description of the Prior Art

Copending U.S. Pat. application Ser. No. 103,865 of Myron S. Simon filed Jan. 4, 1971 discloses and claims certain indicator dyes derived from 1-naphthols which find particular utility as optical filter agents in photographic processes for protecting an exposed photosensitive material from post-exposure fogging during development in the presence of incident light. Specifically, the 1-naphthol indicator dyes disclosed therein comprise 3,3-disubstituted phthalides and naphthalides wherein the 3,3 substituents are 4'-hydroxy-1'-naphthyl radicals at least one and preferably both of which possess a hydrogen-bonding group, such as, a carboxy, hydroxy, sulfonamido or sulfamoyl group substituted on a carbon atom adjacent to the 4'-hydroxy group. Among such dyes are phthalides and naphthalides wherein one or both of the 4'-hydroxy-1'-naphthyl radicals are substituted with a carboxy group in the 3'-position and which additionally may be substituted with an immobilizing group to render the dye substantially non-diffusible in a given photographic processing composition.

Various methods have been employed in the synthesis of the aforementioned dyes including carboxy-substituted 1-naphthol naphthalides. Among such methods is the base-catalyzed reaction of a 2-carboxy-1-naphthol and certain naphthalide intermediates which forms the subject matter of copending U.S. Pat. application Ser. No. 314,096 of Paul S. Huyffer and John Wasatonic filed concurrently herewith. According to the method disclosed and claimed therein, a 2-carboxy-1-naphthol and an intermediate, 3-Z-3-(3'-carboalkoxy-4'-hydroxy-1'-naphthyl)naphthalide wherein Z is a leaving group, are reacted in the presence of a base to form the corresponding dye precursor which is then hydrolyzed to yield the indicator dye product.

The present invention is concerned with an improvement in the above method utilizing a particular class of naphthalide intermediates that give substantially increased conversions to dye precursor which, in turn, results in a substantial increase in product yield.

SUMMARY OF THE INVENTION

It is, therefore, the primary object of the present invention to provide a method of synthesizing 1-naphthol naphthalide indicator dyes.

Other objects of this invention will in part be obvious and will in part appear hereinafter.

The invention accordingly comprises the processes involving the several steps and the relation and order of one or more of such steps with respect to each of the others, and the products and compositions possessing the features, properties and the relation of elements which are exemplified in the following detailed disclosure, and the scope of the application of which will be indicated in the claims.

According to the present invention, carboxy-substituted 1-naphthol naphthalides are synthesized by condensing (a) a 2-carboxy-1-naphthol and (b) an intermediate, 3-OX-3-(3'-lower carboalkoxy-4'-hydroxy-1'-naphthyl)naphthalide wherein X is an acyl group, in the presence of a catalytic amount of base to yield the corresponding dye precursor. The lower carboalkoxy group of the dye precursor is then converted to a carboxy group to yield the corresponding dye product.

For a fuller understanding of the nature and objects of the invention, reference should be had to the following detailed description.

DESCRIPTION OF THE PREFERRED EMBODIMENTS

It has been found that by-product formation resulting from competing side reactions may be substantially reduced in the base-catalyzed condensation of a 2-carboxy-1-naphthol and a dye intermediate by employing as the intermediate, a 3-OX-3-(3'-lower carboalkoxy-4'-hydroxy-1'-naphthyl)naphthalide wherein X is an acyl radical derived from an organic carboxylic acid, aromatic or aliphatic. Specifically, the method of preparing carboxy-substituted 1-naphthol naphthalides according to the present invention comprises:

(A) reacting (a) a 3-OX-3-(3'-lower carboalkoxy-4'-hydroxy-1'-naphthyl)naphthalide wherein X is an acyl radical derived from a carboxylic acid and (b) a 2-carboxy-1-naphthol, unsubstituted or substituted with an aliphatic group in a molar ratio of about 1.0–1.5:1 in inert organic solution at a temperature not exceeding about 85°C. in the presence of a catalytic amount of non-water producing base having a pKa of not less than about 2 to form the corresponding 3-(3'-lower carboalkoxy-4'-hydroxy-1'-naphthyl)-3-(3''-carboxy-4''-hydroxy-1''-naphthyl)naphthalide dye precursor and (B) hydrolyzing said dye precursor to form the corresponding 3-(3'-carboxy-4'-hydroxy-1'-hydroxy-1'-naphthyl)-3-(3''-carboxy-4''-hydroxy-1''-naphthyl)-naphthalide dye product.

Unlike other naphthalide intermediates where the leaving group is, for example, an ether, the subject intermediates containing an ester leaving group are unique in that they are capable of existing in substantially complete equilibrium with the corresponding dehydro intermediate, i.e., quinone methide and thus, have little, if any, tendency to form irreversible O-alkylation and O-acylation by-products. As shown in the following scheme, the intermediates employed in the present method, as illustrated by a monoacetate intermediate, undergo an irreversible C-alkylation to produce the desired dye precursor but undergo reversible O-alkylation and O-acylation reactions. Because of the highly reversible nature of these main side reactions, conversion to dye precursor is substantially increased while by-product formation from competing side reactions is substantially reduced so that the dye product ultimately may be recovered in better yields and higher purity. To obtain the dye product, the dye precursor resulting from the C-alkylation in the following scheme is hydrolyzed by treating with aqueous alkali to convert the carbomethoxy to a free carboxy group.

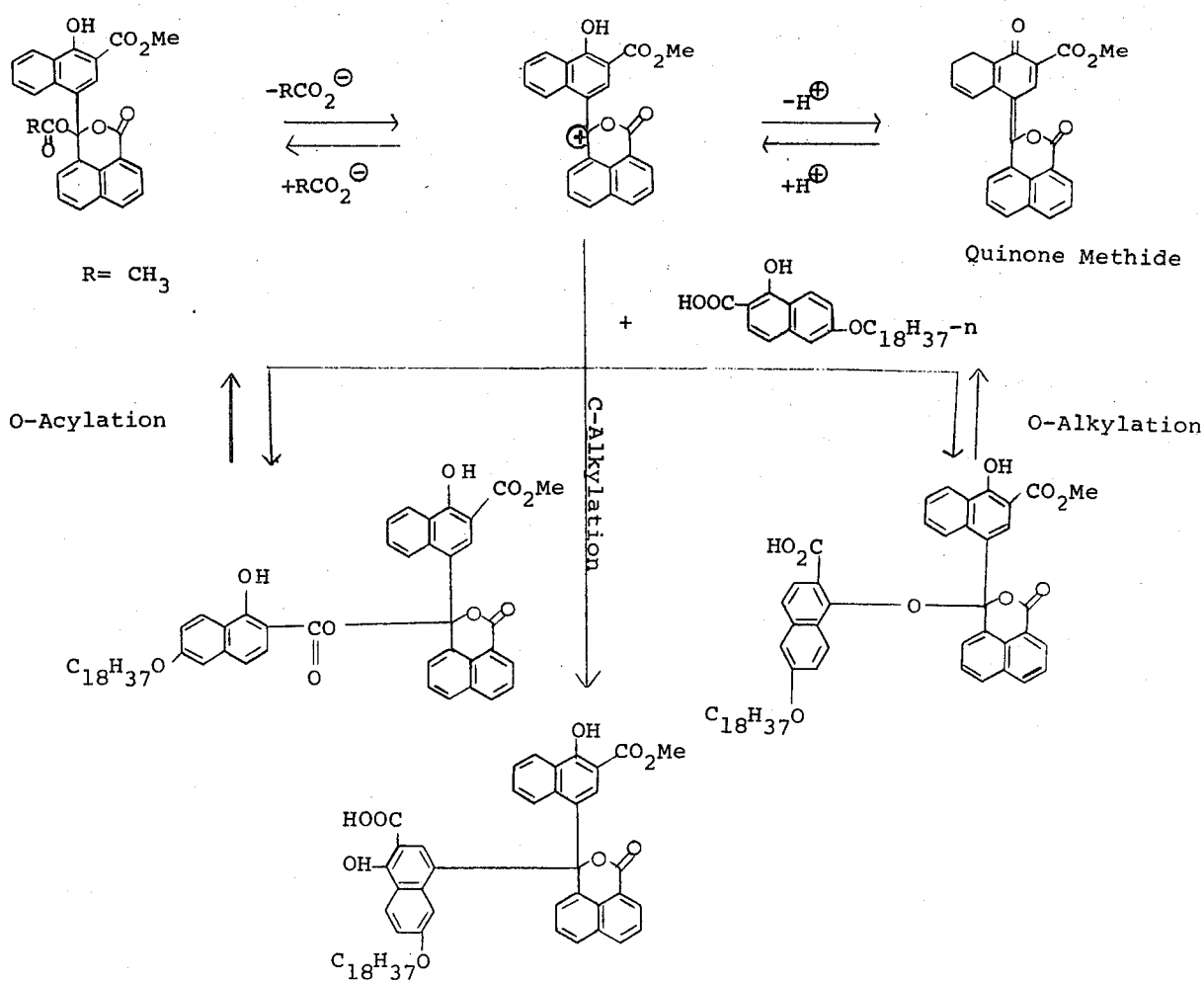

Though the method of the present invention may be used in the synthesis of 1-naphthol naphthalides, in general, it finds particular utility in the synthesis of indicator dyes as represented by the formula:

(I) 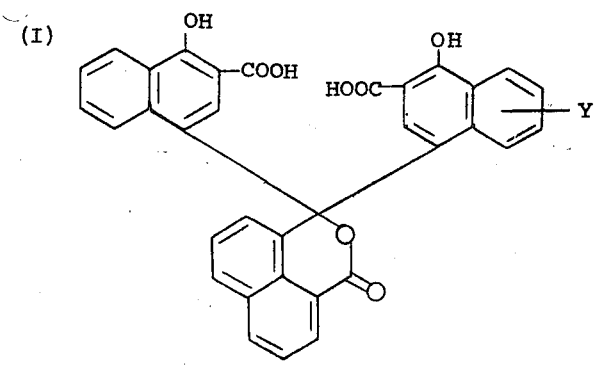

wherein Y is hydrogen or an aliphatic group usually containing up to about 20 carbon atoms.

The aliphatic group, branched or straight chain, may be alkyl, such as methyl, ethyl, isopropyl, butyl, t-butyl, hexyl, dodecyl, octadecyl or eicosanyl, alkenyl, such as, 3-butenyl, 2-methyl-1,3-butadienyl, 2-hexenyl and 9-octadecenyl; alkoxy, such as, ethoxy, butoxy, 1-ethoxy-2-($\beta$-ethoxyethoxy), hexyloxy, dodecyloxy, and octadecyloxy; and alkoxyalkyl, such as, methoxyethyl, methoxyethoxyethyl, butoxydodecyl and ethoxyethoxyhexadecyl. Also, the aliphatic group may be substituted with a solubilizing group, i.e., the alkyl, alkenyl, alkoxy and alkoxyalkyl groups enumerated above may be substituted with a solubilizing group, e.g., —OH, —COOH and —SO$_3$H.

Specific examples of 1-naphthol indicator dyes that may be prepared according to the method of the present invention are as follows:

(1) 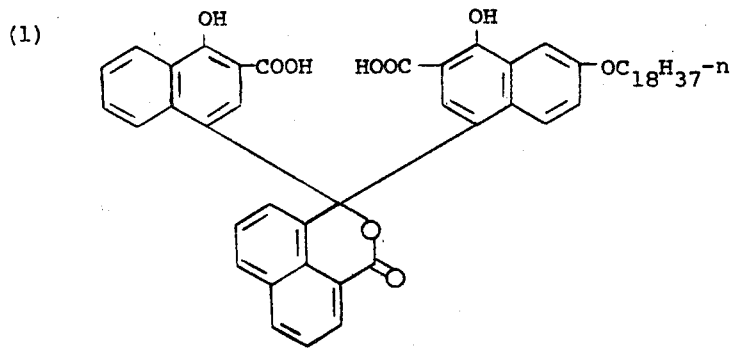

(2) 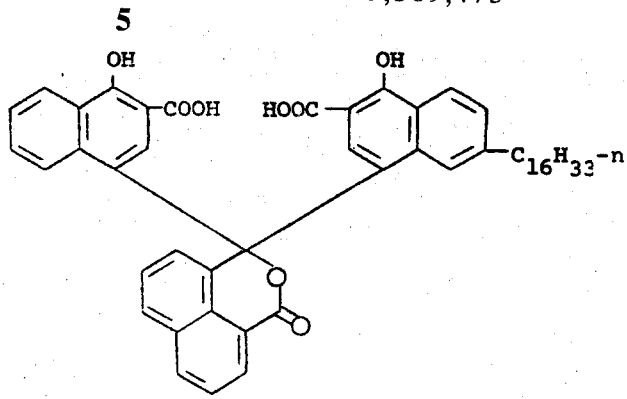
(3) 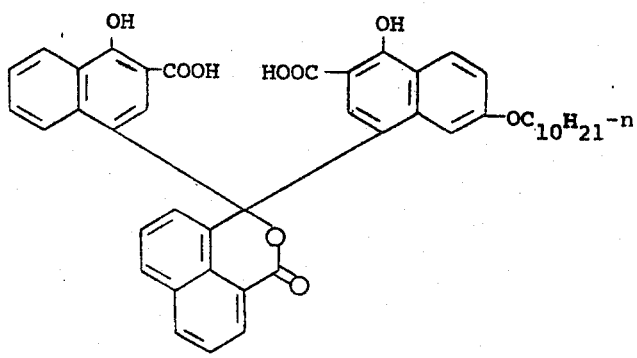
(4) 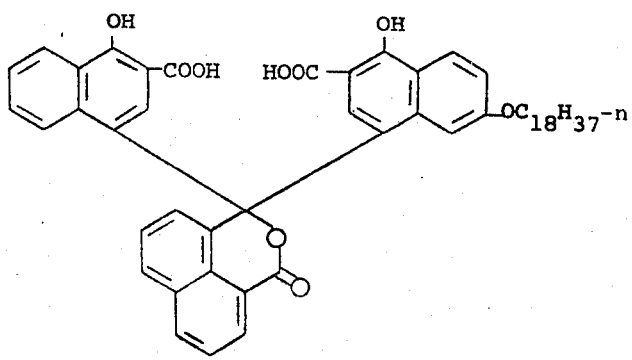
(5) 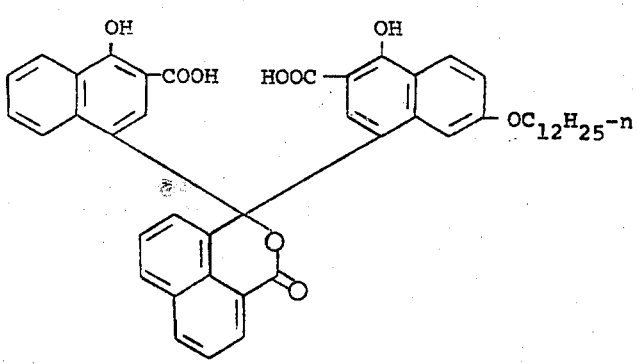
(6) 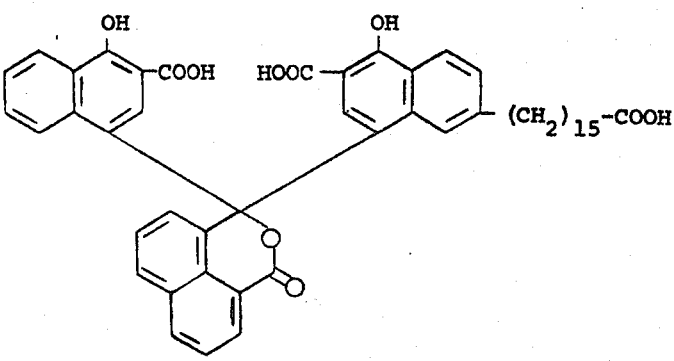

(7) 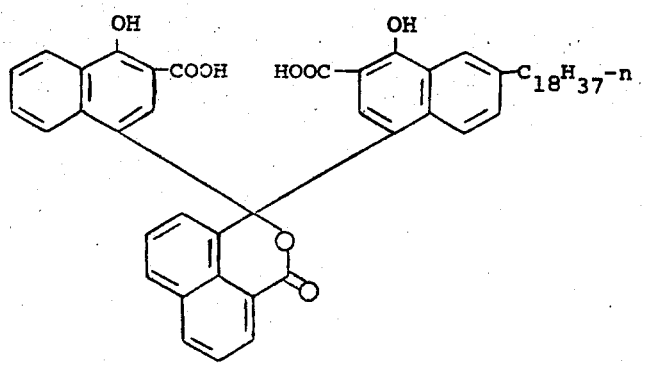
(8) 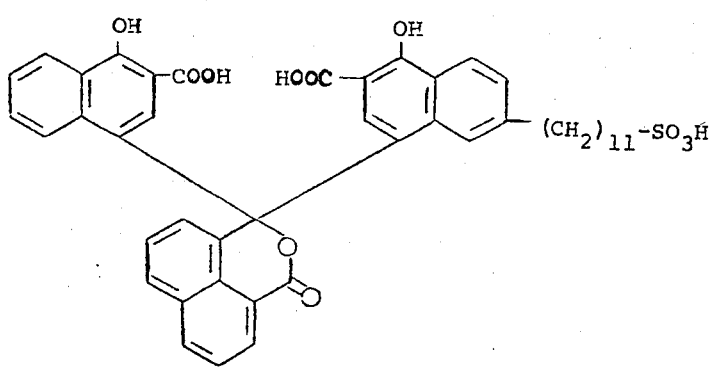
(9) 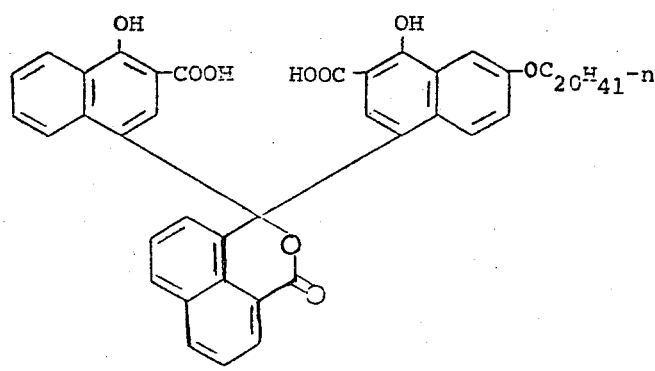
(10) 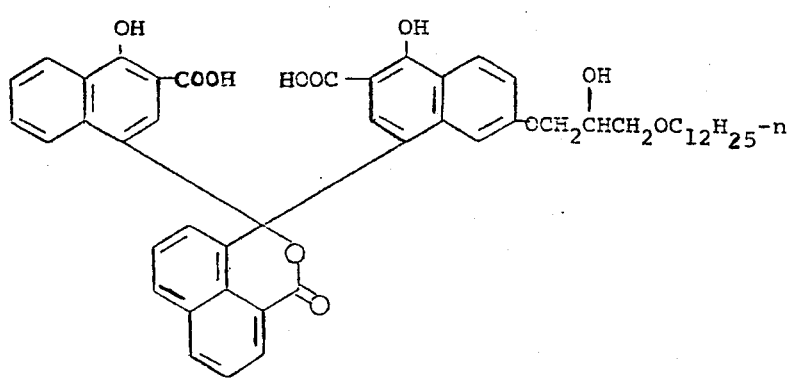
(11) 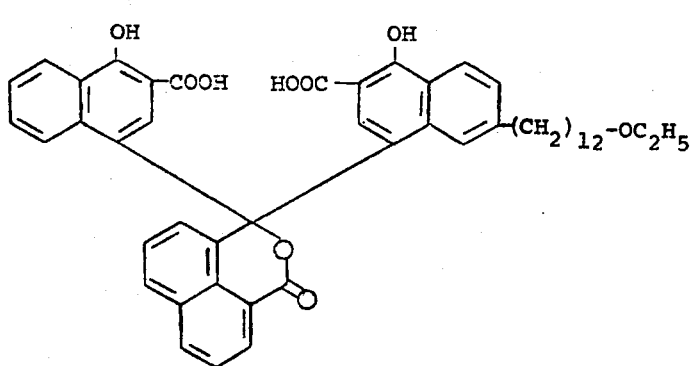

(12) 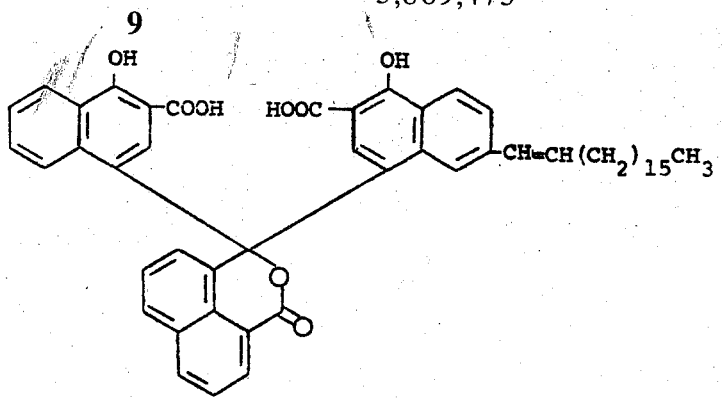
(13) 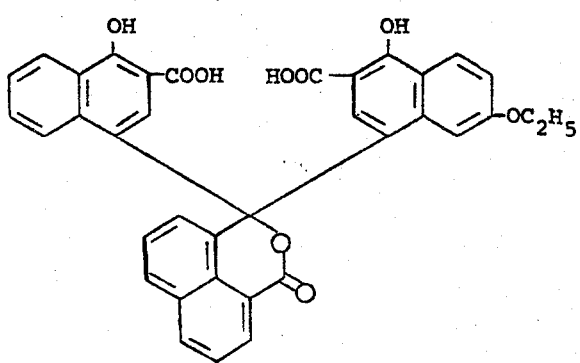
(14) 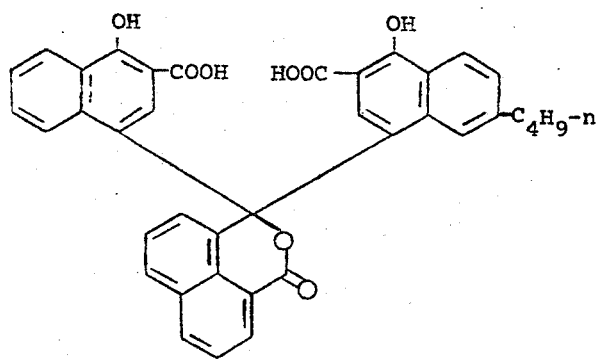
(15) 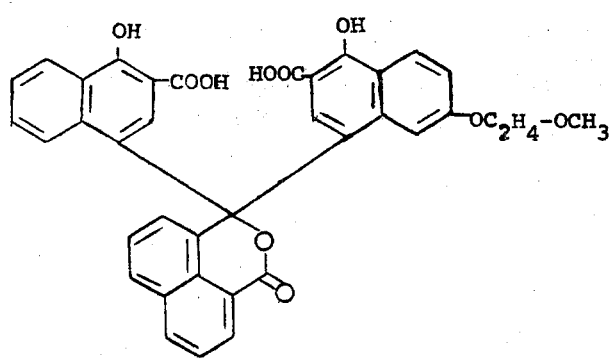
(16) 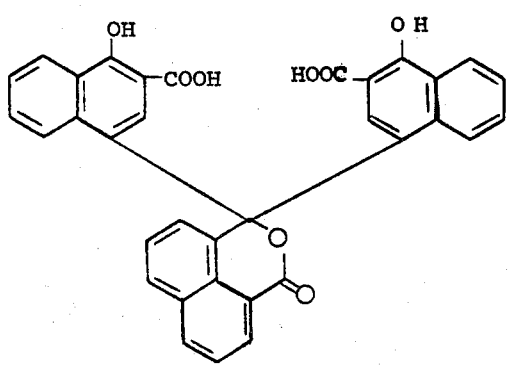

In carrying out the method of the present invention, the 3-OX-3-(3'-lower carboalkoxy-4'-hydroxy-1'-naphthyl) naphthalide intermediate and the 2-carboxy-1-naphthol may be reacted in a molar ratio of about 1.0 to 1.5 moles of intermediate per mole of naphthol. To ensure high conversions while maintaining purity at relatively high levels, the intermediate is used in slight excess, and preferably, the intermediate and 1-naphthol are reacted in a molar ratio of about 1.1 to 1.2:1. The base selected to catalyze the reaction may be used in amounts ranging between 0.01 and 2.0, but preferentially between about 0.05 and 0.15 mole per 1.0 mole of 2-carboxy-1-naphthol.

Useful as the catalyst are all bases strong enough to form salts with the naphthol carboxylic acid, i.e., 2-carboxy-1-naphthol present in the reaction including weaker bases having a pKa down to but not less than about 2, all of which are capable of forming salts with the naphthol carboxylic acid to some extent. Also, because the intermediates tend to be sensitive to moisture, the base selected to catalyze the reaction should not produce or release water during the reaction. Other than inorganic oxides and hydroxides and other bases that would form water, any base having a pKa of not less than about 2, including both organic and inorganic materials may be employed. Illustrative bases that may be used as the catalyst include inorganic bases, such as, lithium, sodium and potassium hydrides or amides, and organic bases, for example, primary, secondary and tertiary aliphatic amines, such as, n-decylamine, di-n-butylamine, triethylamine, n-butylamine, diisopropyl-amine, piperazines, piperidines, morpholines and aromatic amines, such as, aniline, 4-bromoaniline, N,N-diethylaniline, p-toluidine, N-methylaniline. Particularly useful catalysts are aromatic N-heterocyclic bases, such as, pyridines, picolines, lutidines, pyrimidines, pyridazines, pyrazines, imidozoles and quinolines. Preferred catalysts are the pyridines including pyridine and pyridine substituted with, for example, hydroxy, amino, halo, lower alkoxy and lower alkyl.

As the reaction media, any inert organic liquid that is a solvent for the reactants may be employed. Suitable organic solvents include acetonitrile, methyl ethyl ketone, hexane, 1,4-dioxane, tetrahydrofuran, benzene, toluene, xylene, cyclohexane, methylene chloride, t-butanol and dimethoxyethane. However, the highest yields were obtained using aromatic hydrocarbons, such as, benzene or toluene.

For achieving practical reaction times, the reaction is conducted at elevated temperatures. However, to prevent decarboxylation of the naphthol reactant, the temperature should not exceed about 85°C., and usually, the reaction temperature ranges between about 60° and 85°C.

Because of the moisture sensitivity of the naphthalide intermediates, the condensation should be conducted under substantially anhydrous conditions, and though not essential, the reaction is preferably conducted under an inert atmosphere, for example, nitrogen.

The dry precursor thus obtained may be hydrolyzed, for example, by treating with an alkaline hydroxide in aqueous or aqueous-organic solution to convert the 3'-carboalkoxy to a 3'-carboxy group to yield the desired indicator dye product. The alkaline hydroxide may be an alkaline earth hydroxide, such as calcium or barium hydroxide, or preferably, an alkali metal hydroxide, such as, sodium or potassium hydroxide. Any water-miscible organic liquid may be used to form the aqueous organic solution, for example, alcohols, such as, ethanol, methanol, isopropanol, or water miscible ethers, for example, 1,2-dimethoxyethane or tetrahydrofuran.

Though the dye precursor isolated from the reaction solution may be hydrolyzed directly to the corresponding indicator dye product, it may be purified, for example, by crystallization of the crude material in an appropriate solvent prior to the hydrolysis step. Suitable solvents include alcohols, such as, isopropanol; combinations of alcohols with chlorinated hydrocarbons, such as, isopropanol and methylene chloride mixture; or with ketones, such as, methanol and acetone mixture; and combinations of nitriles with ethers, esters, ketones or hydrocarbons, such as, mixtures of acetonitrile with dimethoxyethane, n-butyl formate, methyl ethyl ketone or benzene.

The 2-carboxy-1-naphthols employed in the subject method may be represented by the formula:

(II) 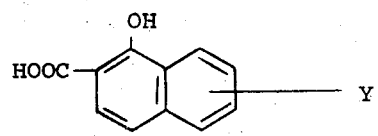

wherein Y has the same meaning given in formula I above.

Among the naphthols which are particularly useful in the production of indicator dyes that are relatively or substantially immobile in a given solution are the alkoxy-substituted 2-carboxy-1-naphthols which form the subject matter of copending U.S. Pat. application Ser. No. 383,037 filed July 26, 1973, a continuation-in-part of Ser. No. 174,171 of Richard B. Greenwald filed Aug. 19, 1971, now abandoned. These naphthols may be synthesized by treating a 1,6- or 1,7-naphthalenediol with an acetylating agent in the presence of a Lewis acid catalyst to yield the corresponding 2-acetyl compound followed by oxidizing the 2-acetyl to a 2-carboxy group and reacting the 2-carboxy compound with an alkyl halide to yield the 2-carboxy-6- (or 7-) alkoxy-1-naphthol. These naphthols also may be prepared by treating a 1,6- or 1,7-naphthalenediol in solution in an aprotic solvent with carbon dioxide in the presence of a strong base to form the corresponding 2-carboxy compound which is then reacted with an alkyl halide to yield the alkoxy-substituted 2-carboxy-1-naphthol.

The naphthalide intermediates employed in the subject method may be represented by the formula:

(III) 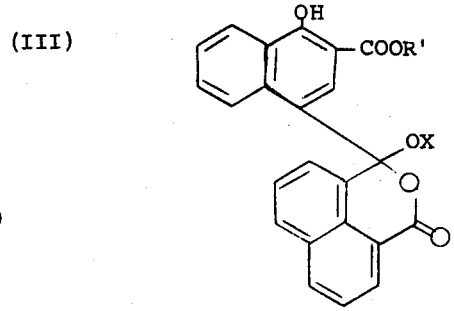

wherein X is an acyl radical of an organic di- or mono-carboxylic acid, aromatic or aliphatic including branched or straight chain saturated or unsaturated aliphatic acids and R' is lower alkyl containing 1 to 4 carbon atoms, e.g., ethyl, propyl, isopropyl, n-butyl, t-butyl, and preferably, methyl. Typical acyl radicals are those derived from acids, such as, benzoic acid, phthalic acid, isophthalic acid, cinnamic acid, α-naphthoic acid, β-naphthoic acid, acetic acid, butyric acid, caproic acid, capric acid, malonic acid, glutaric acid, sebacic acid, acrylic acid, crotonic acid, vinylacetic acid, methacrylic acid, maleic acid, fumaric acid, muconic acid and so forth. The acid may be unsubstituted or substituted with, for example, amino, hydroxy, halo, mercapto, nitro, cyano, lower alkyl, lower alkoxy, acetyl, phenyl, phenyl substituted with methoxy, nitro, halo or cyano, phenoxy and phenoxy substituted with nitro, halo or cyano. Particularly useful because of their convenience and economy of manufacture are the monoester intermediates, 3-OCR-3-(3'-COOR'-4'-hydroxy-1'-naphthyl)naphthalides wherein R is an alkyl group containing 1 to 10 carbon atoms, particularly unsubstituted and mono-substituted alkyl derived from a saturated aliphatic monocarboxylic acid, RCOOH.

The above intermediates may be prepared according to the method of copending U.S. Pat. application Ser. No. 314,098 of Yunn H. Chiang filed concurrently herewith by reacting a 3-hydroxy-3-(3'-lower carboalkoxy-4'-hydroxy-1'-naphthyl) naththalide and an acid anhydride of an organic carboxylic acid having a pKa between about 2.5 and 5.0 in an inert organic solvent in the absence of a strong acid or a base and/or prepared according to the method of copending U.S. Pat. application Ser. No. 314,095 of Michael H. Feingold filed concurrently herewith by reacting a 3-(3'-lower carboalkoxy-4'-oxo-1'-naphthylidene)naphthalide and an organic carboxylic acid. Illustrative acids which may comprise the acyl radical include the following:

| | |
|---|---|
| Acetic | Anisic |
| Acetoacetic | o-β-Anisylpropionic |
| Acrylic | m-β-Anisylpropionic |
| α-Aminoacetic (glycine) | p-β-Anisylpropionic |
| Angelic | n-Butyric |
| Adipic | iso-Butyric |
| p-Aminobenzoic | α-Aminobutyric |
| n-Caproic | Cyanopropionic |
| iso-Caproic | Dibromoacetic |
| Chloroacetic | Dichloroacetic |
| o-Chlorobenzoic | Dihydroxybenzoic(2,2-) |
| m-Chlorobenzoic | Dihydroxybenzoic(2,5-) |
| p-Chlorobenzoic | Dihydroxybenzoic(3,4-) |
| α-Chlorobutyric | Dihydroxybenzoic(3,5-) |
| β-Chlorobutyric | Dimethylglycine |
| Benzoic | Diphenylacetic |
| Bromoacetic | Ethylbenzoic |
| o-Bromobenzoic | Ethylphenylacetic |
| m-Bromobenzoic | Fluoroacetic |
| α-Bromocaproic | Fluorobenzoic |
| γ-Chlorobutyric | Fumaric |
| o-Chlorophenoxyacetic | Glutaric |
| m-Chlorophenoxyacetic | Heptanoic |
| p-Chlorophenoxyacetic | Hexanoic |
| o-Chlorophenylacetic | o-Hydroxybenzoic |
| m-Chlorophenylacetic | m-Hydroxybenzoic |
| p-Chlorophenylacetic | p-Hydroxybenzoic |
| β-(o-Chlorophenyl)propionic | β-Hydroxybutyric |
| β-(m-Chlorophenyl)propionic | γ-Hydroxybutyric |
| β-(p-Chlorophenyl)propionic | β-Hydroxypropionic |
| α-Chloropropionic | Iodoacetic |
| Crotonic | o-Iodobenzoic |
| Cyanoacetic | m-Iodobenzoic |
| γ-Cyanobutyric | Lactic |
| o-Cyanophenoxyacetic | Lysine |
| m-Cyanophenoxyacetic | Mercaptoacetic |
| p-Cyanophenoxyacetic | β-Mercaptopropionic |
| Methoxyacetic | o-Phenylbenzoic |
| β-Methoxypropionic | γ-Phenylbutyric |
| Muconic | α-Phenylpropionic |
| Maleic | Pimelic |
| Methacrylic | Propionic |
| o-Nitrobenzoic | iso-Propylbenzoic |
| m-Nitrobenzoic | Sebacic |
| p-Nitrophenylacetic | Succinic |
| o-β-Nitrophenylpropionic | Toluic (o-, m-, p-) |
| p-β-Nitrophenylpropionic | Trihydroxybenzoic (2,4,6-) |
| Nonanic | Trimethylacetic |
| Octanoic | n-Valeric |
| Phenylacetic | iso-Valeric |

The aliphatic and the aromatic anhydrides can be prepared by the many methods known to the art, such as acylation of carboxylic acids by aryl halides, interaction of acyl halides and salts of carboxylic acids, interaction of acyl halides with acetic anhydride, etc. (cf. Romeo B. Wagner and Harry D. Zook, Synthetic Organic Chemistry, John Wiley & Sons, Inc. 1953, p. 558).

The 3-hydroxy-3-(3'-lower carboalkoxy-4'-hydroxy-1'-naphthyl)naphthalides may be synthesized by forming a complex of a 1-hydroxy-2-alkyl naphthoate (2-carboalkoxy-1-naphthol) by reacting the naphthoate with anhydrous aluminum chloride followed by the addition of solvent, such as, nitrobenzene. Naphthalyl dichloride (3,3-dichloronaphthalide) is then added to the solution containing the naphthoate as an activated complex to form the 3-hydroxy-(3'-lower carboalkoxy-4'-hydroxy-1'-naphthyl)naphthalide.

The following examples are given to further illustrate the present invention and are not intended to limit the scope thereof.

EXAMPLE 1

Preparation of the compound of formula (4).

The intermediate employed in this example was 3-acetoxy-3-(3'-carbomethoxy-4'-hydroxy-1'-naphthyl) naphthalide having the formula:

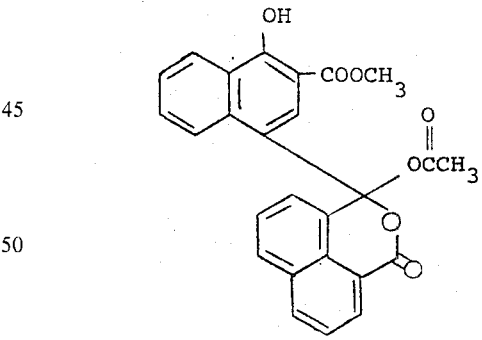

which was prepared as follows:

A mixture of 40.0 g. (0.1 mole) of 3-hydroxy-3-(3'-carbomethoxy-4'-hydroxy-1-naphthyl)naphthalide-1,8, 40 ml. of acetic anhydride (0.43 mole) and 60 ml. of glacial acetic acid was refluxed for about 2 hours with moderate stirring under nitrogen atmosphere. A white solid precipitated out of the red homogeneous solution after approximately 12 minutes. The reaction mixture was diluted with 200 ml. of a 35 percent solution of hexane in toluene (volume percent). After cooling the hexane-toluene suspension to room temperature, an additional 150 ml. of 35 percent hexane in toluene was added. The reaction mixture was cooled in a refrigerator (0° to 5°C.) overnight, filtered, washed with three 100 ml. portions of 35 percent of hexane in toluene and dried to give 42.70 (97 percent by weight yield), of the 3-acetoxy-naphthalide as a snowwhite solid, melting range 218°–22°C. (dec.). Purity by high pressure liquid-liquid chromatography 97.3 to 100 percent.

1. To a 300 ml. 3-neck flask equipped with mechanical stirrer, nitrogen atmosphere and a 20 ml. Dean Stark trap was added 150 ml. benzene. The benzene was refluxed at least 30 min. to dry the solvent, and the apparatus, the trap removing 25 ml. from the initial solvent volume. After the benzene had cooled to 25°C., 9.12 g. (0.02 mole) of 2-carboxy-6-octadecyloxy-1-naphthol, 10.6 g. (0.024 mole) of the above monoacetate intermediate and 0.080 ml. (1.0 m. mole) of pyridine were added in sequence. The mixture was heated to reflux over a 15 min. interval with rapid stirring and maintained at reflux for 3 hours. At this point, the apparatus was converted to downward distillation, and most of the benzene, originally 125 ml., was stripped at atmospheric pressure. A total of 83 ml. was removed allowing 42 ml. of benzene to remain in the reaction mixture, an easily stirred slurry. (Based on the solid obtained by complete stripping of benzene from the slurry, conversion to dye precursor was 92 percent by weight based on the 2-carboxy-1-naphthol and purity was 85 percent by weight).

2. Acetonitrile, 100 ml., was added causing nearly total precipitation of product and the solvent mixture was distilled without fractionation. After 100 ml. was collected, b.p. ~ 75°–79°C., a second 100 ml. portion of acetonitrile was added and another 100 ml. of solvent was collected (b.p. 79°–81°C.). An index of refraction check of the distillate (boiling at 81°C.) revealed pure acetonitrile, confirming the almost complete removal of the benzene. The reaction slurry, containing 42 ml. acetonitrile as solvent, was treated with 96 ml. butyl formate and brought to reflux to complete solution. A final portion, 22 ml., of acetonitrile was carefully added to bring the solvent combination to 60:40 butyl formate: acetonitrile. The solution was cooled to 50° C. in 30 minutes and to 25°C. during the next hour. Crystals started appearing above 60°C. The mixture was stirred at 25° C. for 10–18 hours. The granular solid was filtered and twice reslurried for 20 min. in fresh 100 ml. portions of acetonitrile. After drying in vacuo at 60°C., the product comprising dye precursor weighed 13.76 g. (82 percent by weight) and was analyzed as 97+ percent pure by visible absorption in ethanolic sodium hydroxide.

3. A solution of 6.71 g. (8 m moles) of dye precursor obtained above in 56 ml. isopropanol was prepared by heating the mixture to reflux. A solution of 7.68 g. of 50 percent aqueous sodium hydroxide (96 m. moles) in 88 ml. water was added over 5 minutes and the resulting solution was refluxed under nitrogen for 2 hours. After the heat was removed, acetic acid, 6.4 ml. (104 m. moles) was added over 1 minute and the clear yellow solution was cooled and filtered (from potential solid contaminants). Dropwise addition over 25 minutes to a stirring mixture of 500 ml. ice water, 150 ml. acetic acid and 20 ml. concentrated hydrochloric acid produced a white solid which was filtered, washed with water, the vacuum dried at 60°C. The off-white solid comprising dye product weighed 6.58 g. and had a visible absorption $\epsilon$ (648 nm.) = 36.1 × $10^3$, indicating 97 percent purity. The overall yield of dye at this stage was 82 percent by weight based on the carboxy-naphthol starting material.

4. Exactly 6.00 g. of powdered 97 percent pure dye product and 60 ml. methanol were heated under nitrogen to reflux, over 15 minutes, with rapid stirring, and held at reflux for 30 minutes.

The slurry was allowed to air cool with stirring and kept at 25°C. for 1 ½ hours. Addition of 20 ml. methanol and stirring for two minutes thinned and thick slurry. The white solid was filtered, washed with 35 ml. methanol and vacuum dried at 60°C. The yield of final dye having a visible absorption $\epsilon$ (648 nm.) = 37.1 × $10^3$ (Standard =37.1 × $10^3$), was 5.57 g. (93 percent by weight). This represents an overall yield of title compound of 76 percent by weight based on 2-carboxy-6-octadecyloxy-1-naphthol.

In the above procedure, the dye precursor formed in step 1 may be isolated by complete removal of the benzene and hydrolyzed directly without purification. To facilitate final purification of the dye product, however, the dye precursor usually is purified prior to the hydrolysis step by crystallization from an appropriate solvent, for example, methyl ethyl ketone or dimethoxyethane combined with acetonitrile. Alcohols such as isopropanol or 2-butanol may also be used. Particularly preferred as the crystallization solvent is 60:40 butyl formate: acetonitrile, since this system gives high recovery (80–82 percent) of highly pure precursor (96+ percent) in a single crystallization.

Step 1 was repeated using a 1:1 molar ratio of monoacetate intermediate and 2-carboxy-6-octadecyloxy-1-naphthol and 0.1 equivalent of different bases as catalysts. The catalysts employed, their pKa and the percent by weight conversion to dye precursor obtained with each are shown in the following table.

| Catalyst | pKa | % Conversion |
| --- | --- | --- |
| none | — | 10 |
| 3-chloropyridine | 2.84 | 72 |
| 2-aminopyrimidine | 3.45 | 64 |
| p-toluidine | 5.08 | 32 |
| pyridine | 5.25 | 83 |
| α-picoline | 5.97 | 79 |
| 2,6-lutidine | 6.7 | 73 |
| n-butylamine | 10.77 | 64 |
| triethylamine | 11.01 | 65 |
| di-n-butylamine | 11.25 | 65 |
| lithium hydride | >14. | 57 |

Step 1 also was repeated using different solvents. The substitution of acetonitrile, t-butanol, dimethoxyethane and a mixture of acetonitrile-tetrahydrofuran for benzene gave percent by weight conversions to dye precursor or about 80 percent, 70 percent, 80 percent and 80 percent, respectively.

The final purification of step (4) may be carried out employing different solvent systems. For example, the dye product has been purified using a ternary system of tetrahydrofuran-butyl formate-acetonitrile as follows:

Exactly 5.00 g. of 97 percent pure dye product was dissolved in 7.5 ml. tetrahydrofuran and 7.5 ml. n-butyl formate by heating to reflux with rapid stirring under nitrogen. After an additional 10 minutes of reflux, 17.5 ml. butyl formate was added dropwise such that reflux was maintained. Finally 17.5 ml. acetonitrile was added in like manner. The homogeneous solution was stirred and the solvent mixture distilled at atmospheric pressure until a total of 12.5 ml. of distillate was collected. Crystallization occurred during the latter part of the distillation. Heat was then removed and the mixture allowed to come to room temperature while stirring was continued for a further 18 hours. The white solid was filtered and the cake rinsed with 10 ml. methanol. The solid was then reslurried in 25 ml. cold methanol for 30 minutes, filtered and rinsed with 8 ml. methanol. After vacuum drying at 65°, the final dye had a visible absorption of $\epsilon$ (648 nm.) = 36.8 × $10^3$ (Standard = 37.1 × $10^3$). The yield was 4.45 g. (89 percent by weight).

EXAMPLE 2

Example 1 was repeated except that the basecatalyzed condensation and purification (steps 1 and 2) were carried out as follows:

1. To a 300 ml. 3-neck flask equipped with mechanical stirrer, nitrogen atmosphere and 20 ml. Dean-Stark trap was added 90 ml. benzene. The benzene was refluxed at least 30 min. to dry the solvent and the apparatus. After the benzene (60 ml. total vol.) had cooled to 25°C., the apparatus was converted to downward distillation and 9.12 g. (0.02 mole) of 2-carboxy-6-octadecyloxy-1-naphthol, 10.16 g. (0.023 mole) of monoacetate intermediate and pyridine, 0.080 ml. (1.0 m. mole) were added in sequence. The mixture was heated to boiling over a 15 minute interval and the benzene distilled. A total of 20 ml. was removed over a one hour period, allowing 40 ml. of benzene to remain in the reaction mixture.

2. Acetonitrile, 100 ml. was added causing total precipitation of product and the solvent mixture was distilled without fractionation. After 100 ml. was collected, b.p. 75°–79°C., a second 100 ml. portion of acetonitrile was added and another 100 ml. of solvent was collected (b.p. 79°–81°C.). An index of refraction check of the distillate boiling at 81°C. revealed pure acetonitrile, confirming the almost complete removal of the benzene. The reaction slurry containing 42 ml. acetonitrile as solvent, was treated with 96 ml. butyl formate and brought to reflux to complete solution. A final portion, 22 ml., of acetonitrile was carefully added to bring the solvent combination to 60:40 butyl formate: acetonitrile. The solution was cooled to 50°C. in 30 minutes and to 25°C. during the next hour. Crystals started appearing above 60°C. The mixture was stirred at 25°C. for 10–18 hours. The granular solid was filtered and twice reslurried for 20 minutes in fresh 100 ml. portions of acetonitrile. After drying in vacuo at 60°C., the product weighed 14.36 g. (86 percent by weight) and was analyzed as 97+ percent pure by visible absorption in ethanolic sodium hydroxide.

The 1-hydroxy-6-octadecyloxy-2-naphthoic acid employed in the above Examples was prepared by adding sodium methoxide (67.4 gms., 1.35 mole) to a solution of 1,6-dihydroxy-naphthalene (100 gms., 0.625 mole) in 900 ml. of dry N,N-dimethyl-formamide saturated with dry carbon dioxide gas. A steady flow of carbon dioxide was maintained throughout the reaction. Approximately 125 ml. of dimethylformamide was distilled and the mixture was then refluxed for 15 minutes and an additional 125 ml. of solvent removed. The solution was cooled and the flow of carbon dioxide stopped. The reaction mixture was acidified with concentrated hydrochloric acid and then poured onto about 2000 gms. of ice. The precipitated dark solid was filtered and dried and then triturated with 1 liter of boiling benzene and filtered free of dark impurities. Recrystallization from water gave 1,6-dihydroxy-2-naphthoic acid as a white solid (melting range 220°–221°C.).

To a well-stirred slurry of 1,6-dihydroxy-2-naphthoic acid (5.1 gms., 0.025 mole) in 50 ml. of dry isopropyl alcohol under nitrogen was added potassium t-butoxide (5.65 gms., 0.050 mole). The mixture was heated to reflux and stirred 10–15 minutes and then octadecyl bromide (8.35 gms., 0.025 mole) was added. The reaction was refluxed for 5 hours, cooled and acidified with 20 percent hydrochloric acid. The solid which precipitated was filtered and dried and recrystallized from absolute ethanol to give 3.8 gms. of grey solid. Further recrystallization from chloroform gave 2.3 gms. of 1-hydroxy-6-octadecyloxy-2-naphthoic acid as a white solid (melting range 164°–165°C.).

As noted above, the indicator dyes produced in accordance with the present invention are useful as optical filter agents in photographic processes, and because of their relatively high pKa, are particularly useful in diffusion transfer processes employing highly alkaline processing solutions. Their use as optical filter agents in photographic processes is disclosed and claimed in copending U.S. Pat. application Ser. No. 103,392 of Myron S. Simon and David P. Waller, filed Jan. 4, 1971, now U.S. Pat. No. 3,702,245. Certain 1-naphthol naphthalides including carboxy-substituted 1-naphthol naphthalides form the subject matter of copending U.S. Pat. application Ser. No. 103,865 of Myron S. Simon also filed Jan. 4, 1971.

Since certain changes may be made in the above process without departing from the scope of the invention herein involved, it is intended that all matter contained in the above description shall be interpreted as illustrative and not in a limiting sense.

What is claimed is:

1. A method of preparing 1-naphthol naphthalide indicator dyes which comprises:
    A. reacting (a) about 1.0 to 1.5 moles of a 3-OX-3-(3'-lower carboalkoxy-4'-hydroxy-1'-naphthyl)-naphthalide wherein X is an acyl radical of an organic mono- or discarboxylic acid and (b) about 1.0 mole of a 2-carboxy-1-naphthol in an inert organic solvent at a temperature not exceeding about 85°C. in the presence of about 0.01 to 2.0 moles of non-water producing organic base having a pKa of not less than about 2 to form the corresponding 3-(3'-lower carboalkoxy-4'-hydroxy-1'-naphthyl)-3-(3''-carboxy-4''-hydroxy-1''-naphthyl)naphthalide dye precursor and
    B. hydrolyzing said dye precursor to form the corresponding 3-(3'-carboxy-4'-hydroxy-1'-naphthyl)-3-(3''-carboxy-4''-hydroxy-1''-naphthyl)naphthalide dye product.

2. A method as defined in claim 1 wherein said naphthalide (a) is a

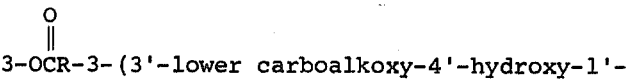

3-OCR-3-(3'-lower carboalkoxy-4'-hydroxy-1'-naphthyl)naphthalide wherein R is an alkyl group containing 1 to 10 carbon atoms.

3. A method as defined in claim 1 wherein said solvent is an aromatic hydrocarbon.

4. A method as defined in claim 3 wherein said hydrocarbon solvent is benzene.

5. A method as defined in claim 1 wherein said base is triethylamine.

6. A method as defined in claim 1 wherein said base is 3-chloropyridine.

7. A method as defined in claim 1 wherein said base is 2-aminopyrimidine.

8. A method as defined in claim 1 wherein said base is p-toluidine.

9. A method as defined in claim 1 wherein said base is pyridine.

10. A method as defined in claim 1 wherein said base is α-picoline.

11. A method as defined in claim 1 wherein said base is 2,6-lutidine.

12. A method as defined in claim 1 wherein said base is n-butylamine.

13. A method as defined in claim 1 wherein said base is di-n-butylamine.

14. A method as defined in claim 1 wherein said naphthol (b) is 2-carboxy-6-octadecyloxy-1-naphthol.

15. A method as defined in claim 14 wherein said naphthalide (a) is 3-acetoxy-3-(3'-carbomethoxy-4'-hydroxy-1'-naphthyl)naphthalide.

16. A method as defined in claim 1 wherein said temperature is between about 60° and 85°C.

* * * * *